United States Patent [19]
Novacek

[11] Patent Number: 5,620,275
[45] Date of Patent: Apr. 15, 1997

[54] TIMBER BEAM HANGER AND RESULTING BEAM CONNECTION

[76] Inventor: Josef Novacek, 4063 West 20th Avenue, Vancouver, British Columbia, Canada, V6S 1G6

[21] Appl. No.: 362,994

[22] Filed: Dec. 23, 1994

[51] Int. Cl.⁶ ............................................. F16B 9/00
[52] U.S. Cl. ................... 403/232.1; 403/230; 403/403; 403/407.1
[58] Field of Search ............................ 403/230, 231, 403/232.1, 174, 178, 256, 258, 260, 294, 407.1, 403, 205; 52/702, 703

[56] References Cited

U.S. PATENT DOCUMENTS

| | | | |
|---|---|---|---|
| 2,988,854 | 6/1961 | McKinley | 403/230 X |
| 3,328,056 | 6/1967 | Heiken | 403/231 |
| 4,280,686 | 7/1981 | Wack | 403/232.1 X |
| 4,299,509 | 11/1981 | Meickl | 403/174 X |
| 4,616,950 | 10/1986 | Morris | 403/232.1 X |
| 4,893,961 | 1/1990 | O'Sullivan et al. | 403/231 X |
| 4,981,388 | 1/1991 | Becken et al. | 403/258 |
| 5,061,111 | 10/1991 | Hosokawa | 403/232.1 |
| 5,104,252 | 4/1992 | Colonias et al. | 403/232.1 |
| 5,242,239 | 9/1993 | Hosokawa | 403/407.1 X |
| 5,253,945 | 10/1993 | Hosokawa | 403/258 |
| 5,295,754 | 3/1994 | Kato | 403/174 |
| 5,438,811 | 8/1995 | Goya | 403/230 X |

FOREIGN PATENT DOCUMENTS

| | | | |
|---|---|---|---|
| 2647861 | 12/1990 | France | 403/232.1 |
| 35142 | 2/1990 | Japan | 403/230 |

OTHER PUBLICATIONS

Front Page and p. 85 of Holzbau Atlas dated 1980, published by Institut für internationale Architektur–Dokumentation, München.

*Primary Examiner*—Harry C. Kim
*Attorney, Agent, or Firm*—Bull, Housser & Tupper

[57] ABSTRACT

A timber beam hanger connects a first member, e.g. a horizontal or inclined beam, to a second member, e.g. a horizontal or inclined beam disposed perpendicularly or obliquely to the first beam, or a vertical post or wall. The beam hanger comprises a generally vertical web, an upper flange extending from an upper edge of the web, a seat extending from a lower edge of the web and a connector. The upper flange and seat are usually rectangular and disposed parallel to each other and normally to the web. The upper flange is secured to an upper face of the first member, and the connector cooperates with the upper flange and is secured to the second member. A joint face of the first member has a generally vertical slit intersecting the upper face and receiving the web therein. The joint face has a generally horizontal slit intersected by the vertical slit at a position remote from the upper face and receiving the seat therein. Weight of the beam is carried on the seat and a variety of connectors connect the beam hanger to the second beam or post. When installed, most of the beam hanger is enclosed in the slits of the first member and thus is essentially invisible when viewed from beneath or sideways of the beam.

8 Claims, 7 Drawing Sheets

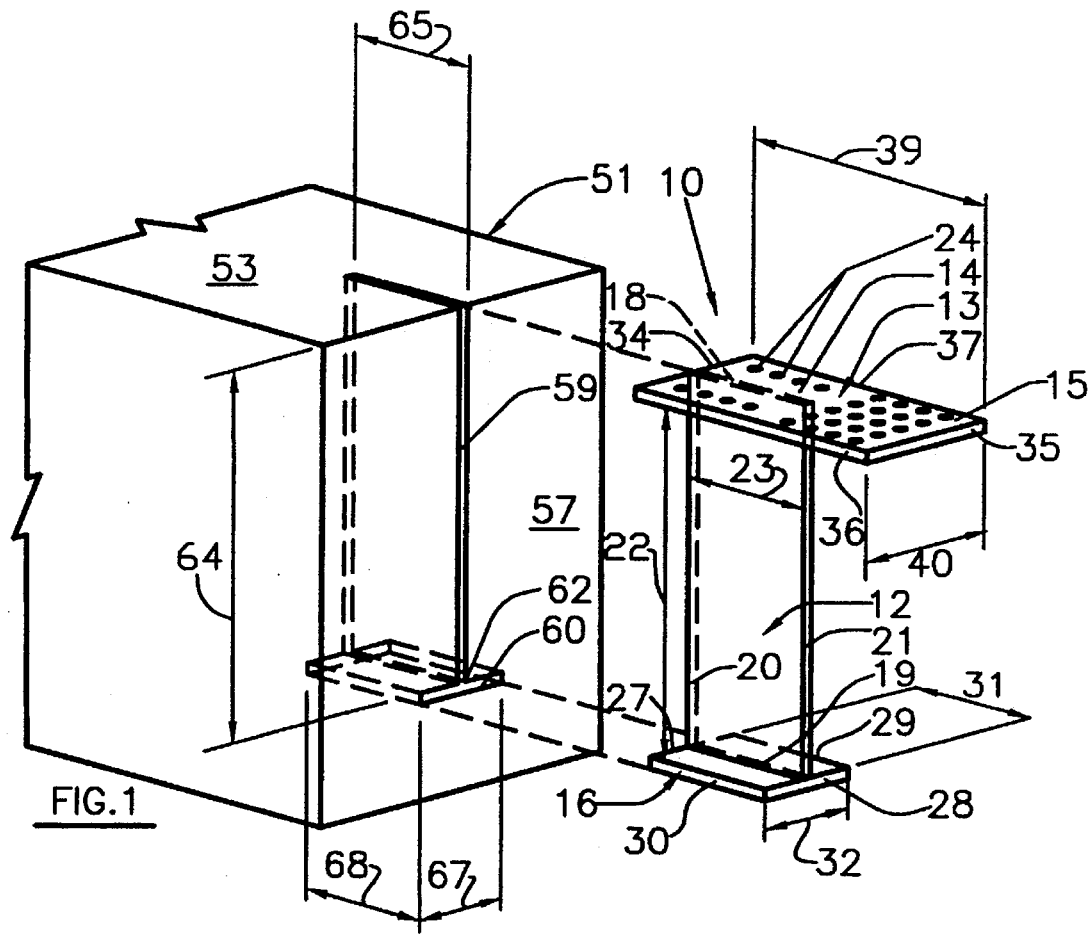
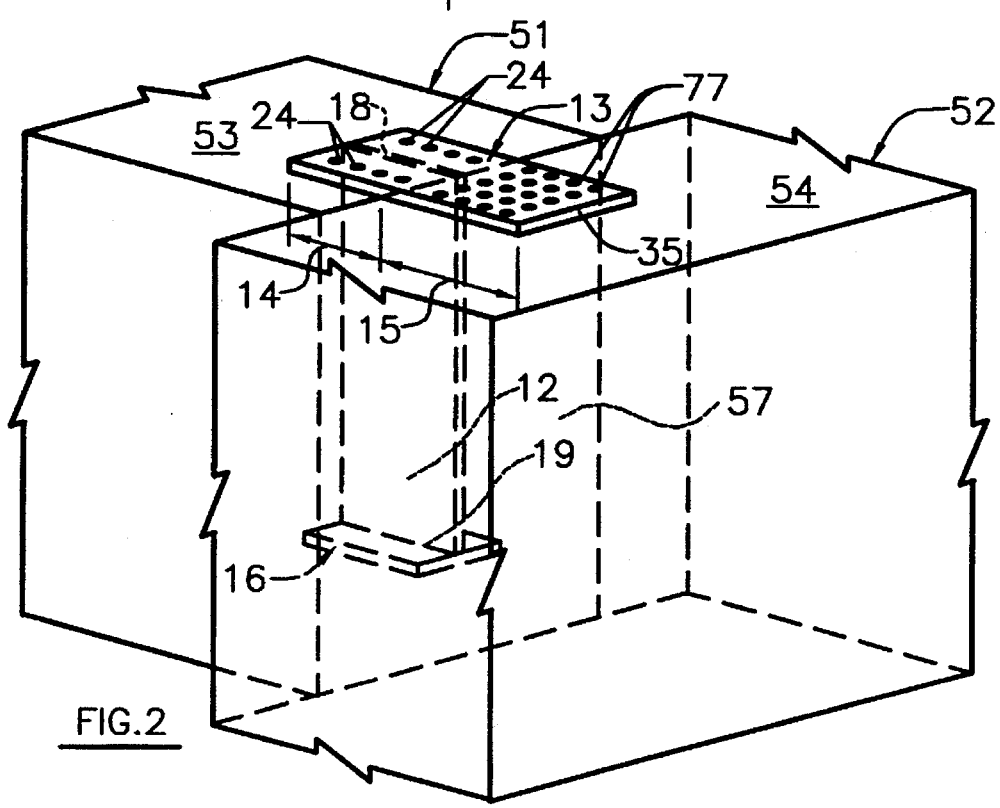

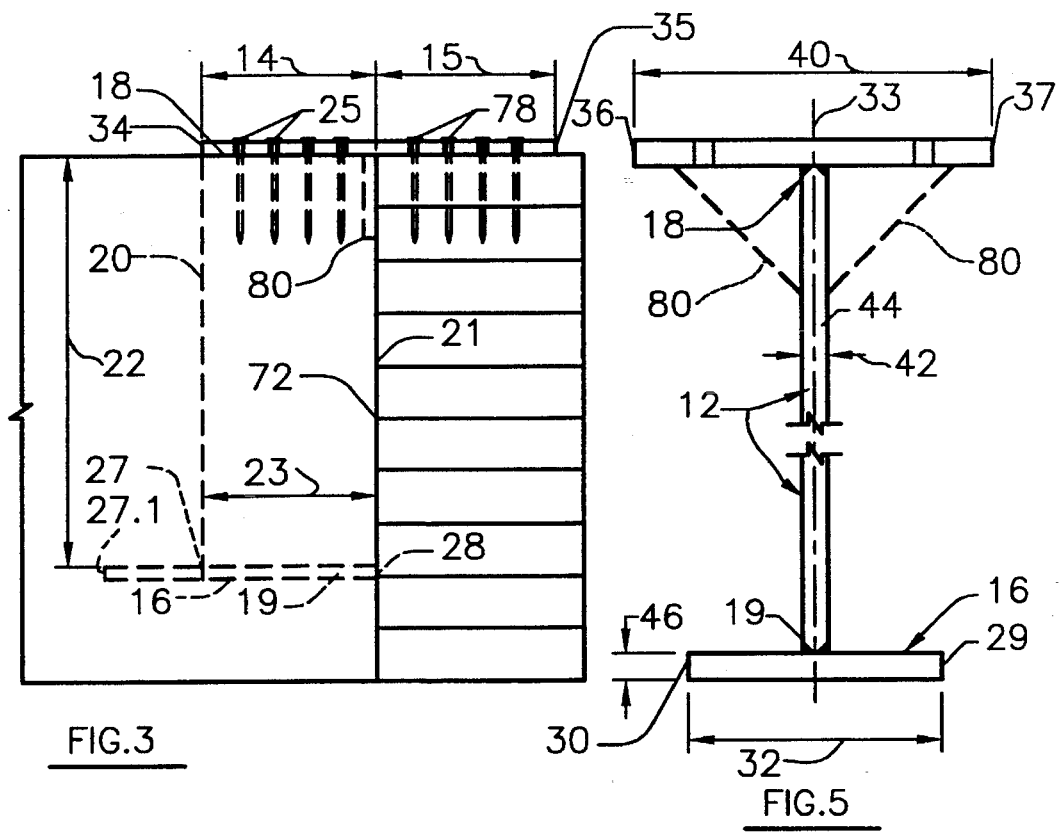
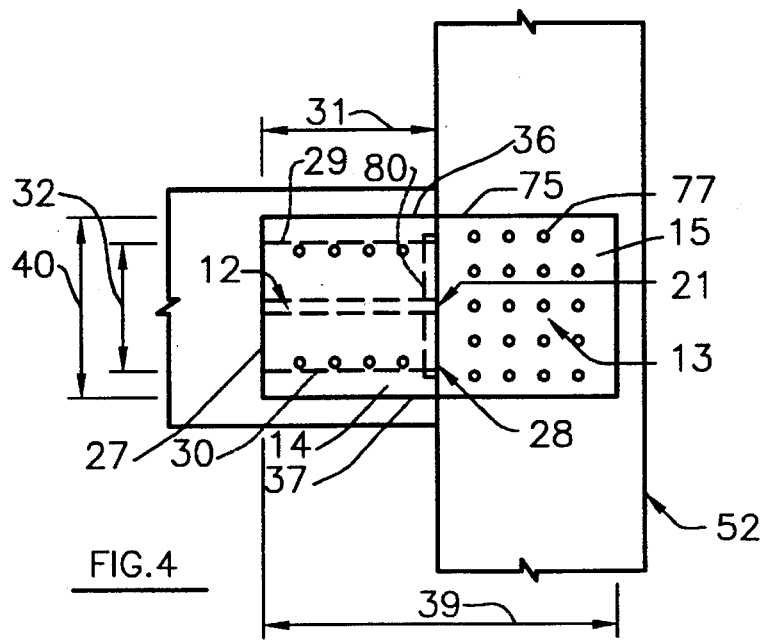

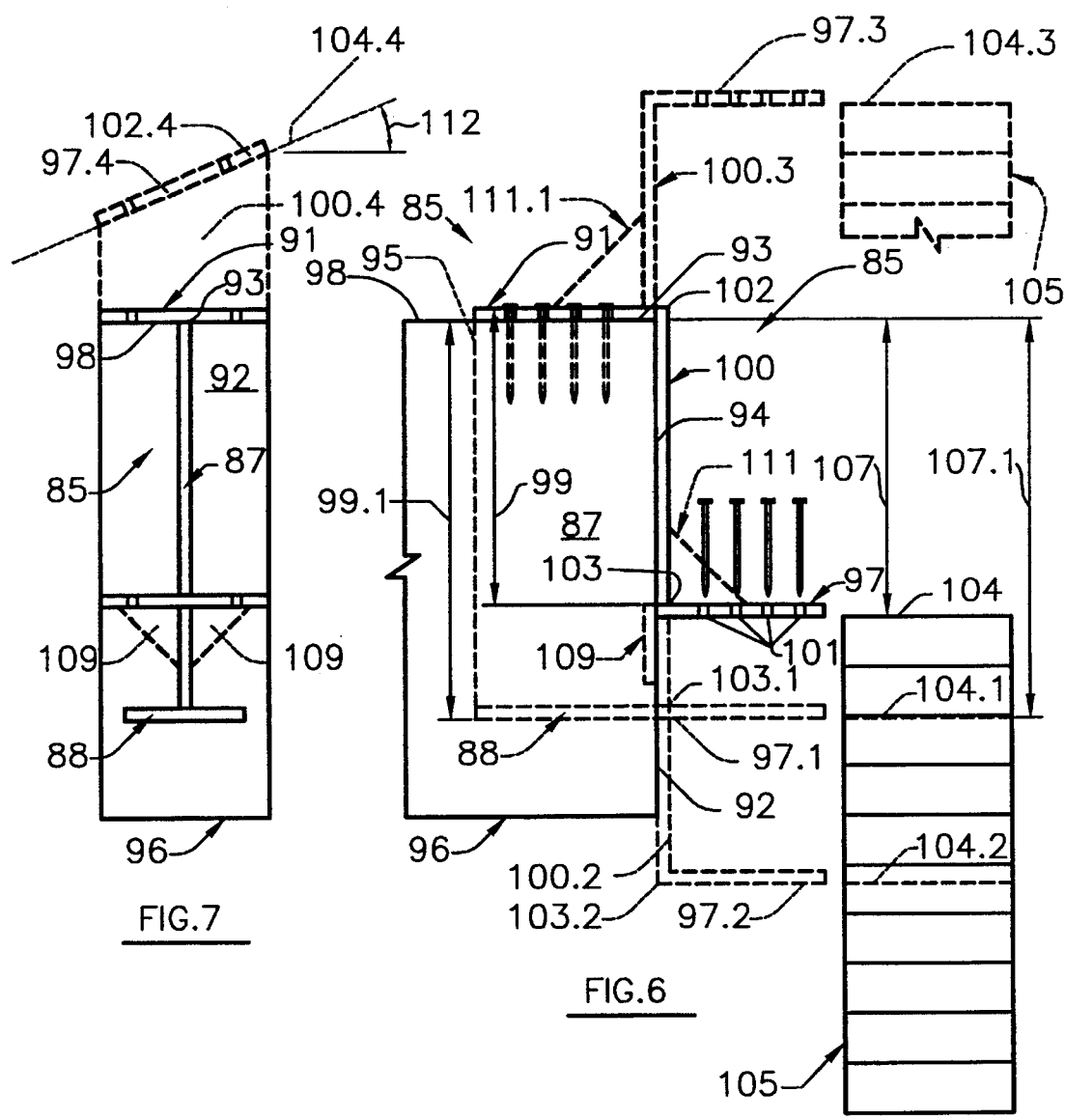

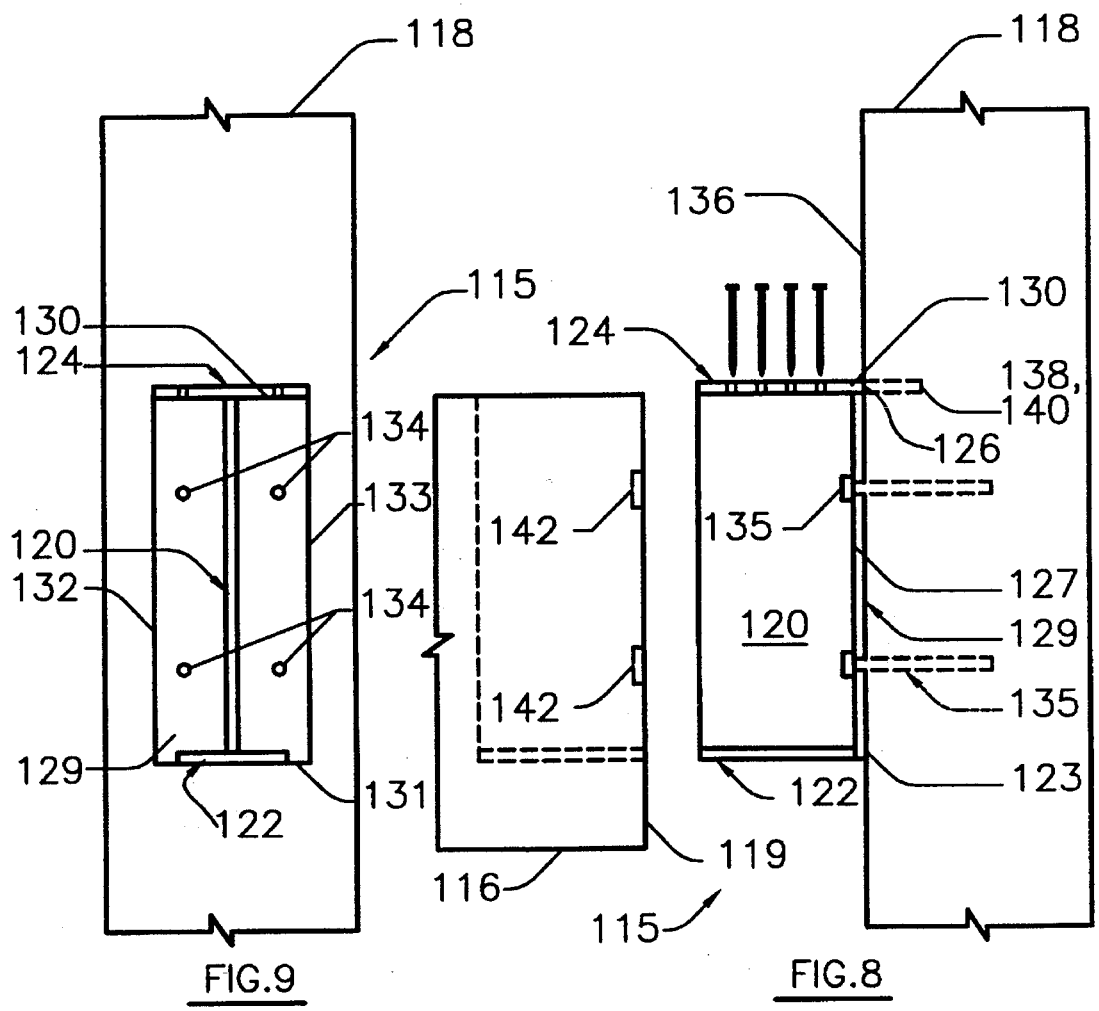

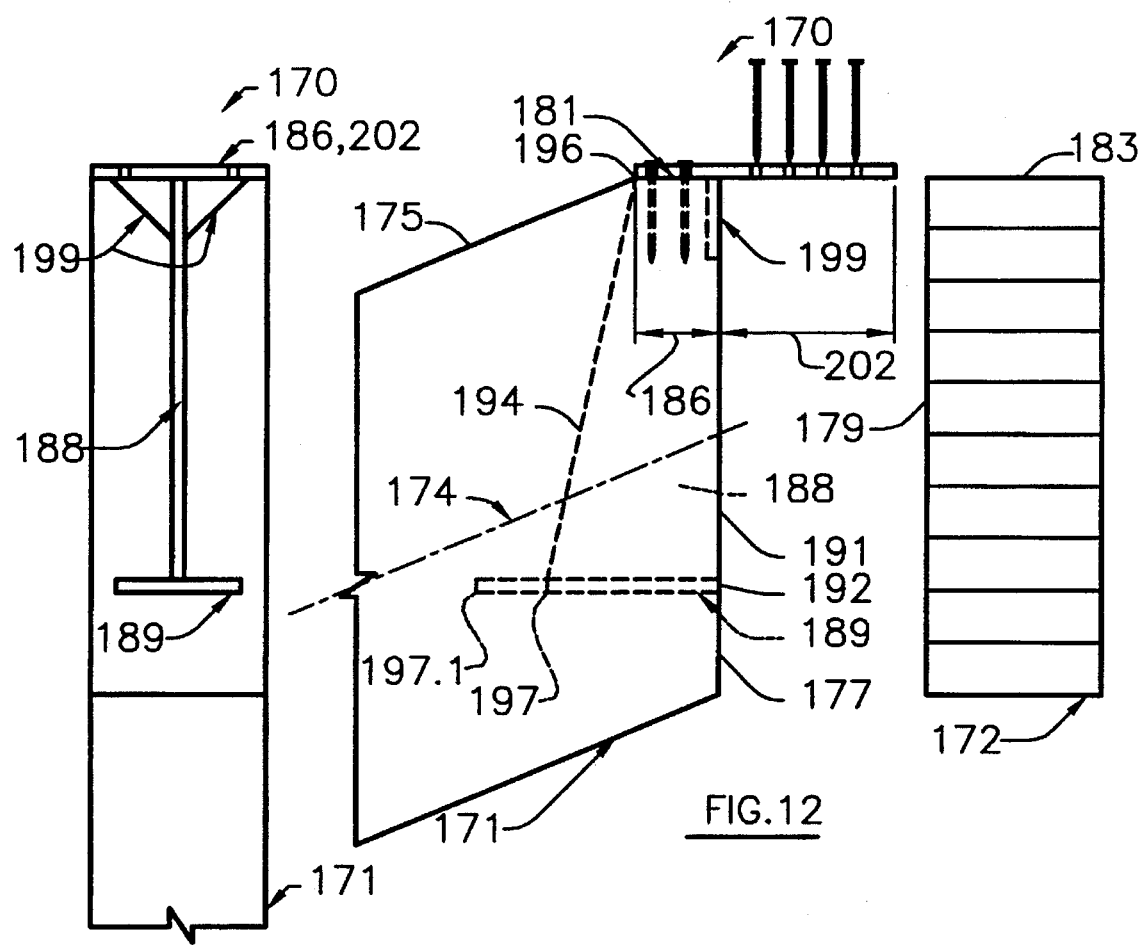

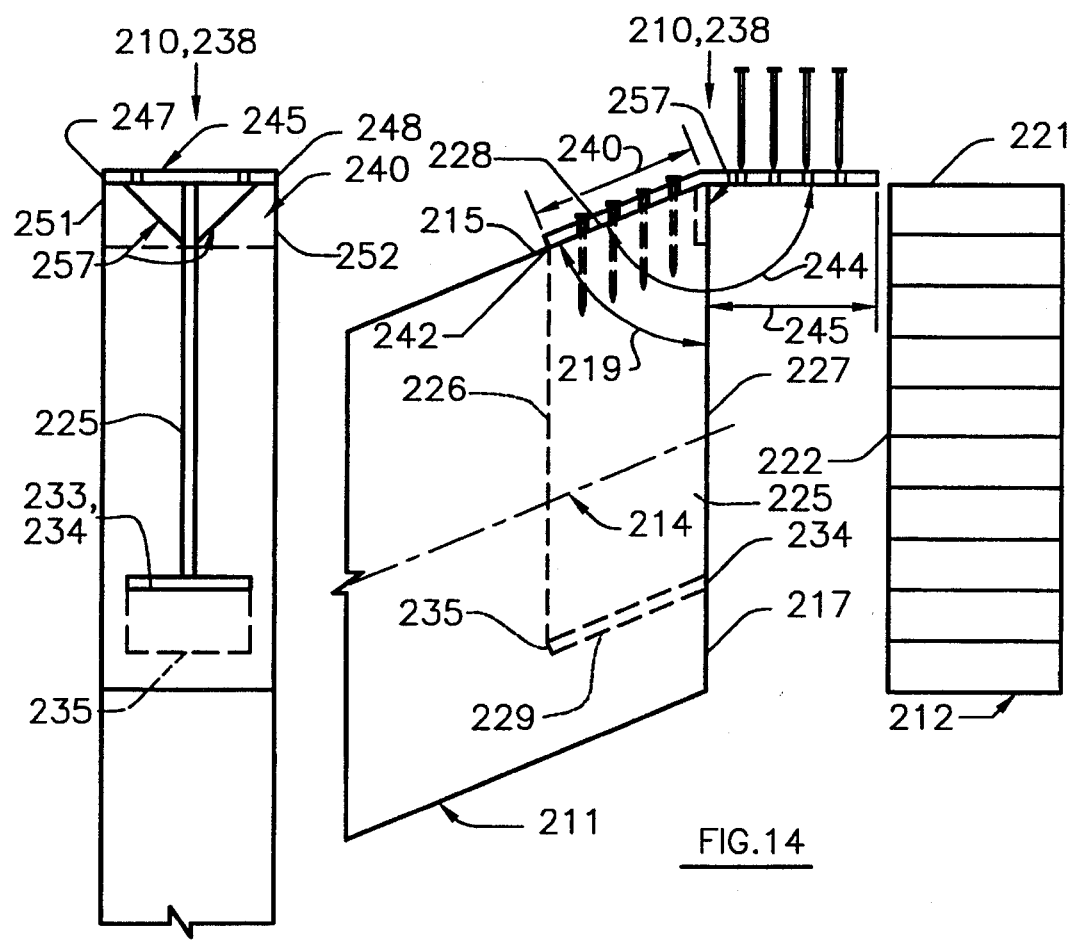

TIMBER BEAM HANGER AND RESULTING BEAM CONNECTION

BACKGROUND OF THE INVENTION

The invention relates to a timber beam hanger and resulting beam connection as used in building construction.

It is well known to use fabricated or formed metal connecting components to interconnect timber beams used in building constructions. The term "timber beam" as used herein refers to a solid or one-piece timber beam, a glue-laminated timber beam, or so-called engineered wood products such as "PARALAM" or "MICROLAM" (trademarks). Such fabricated connecting components reduce or essentially eliminate complex wood cutting which would otherwise be required to form inter-fitting portions of joints, for example cross-halving, mortice and tenon joints, etc. These metal components take many forms to enable a wide variety of beam connections to be easily accomplished, and are commonly termed "beam hangers". In most cases, the beam hangers have at least one pair of parallel side flanges and an interconnecting bottom flange which embrace outer surfaces of the beams and have openings to receive fasteners, for example nails, to pass therethrough so as to secure the beam to the hanger. In heavy duty applications, the fasteners can be heavy duty screws, or for added security, the fasteners can be bolts which pass through aligned openings in the beam and the flanges, and a threaded end of the bolt is secured with a conventional nut. In some architectural designs the beams are exposed in the room, and if hangers as above described are used, at least some of the flanges of the hangers are visible, and sometimes the fasteners are also visible and thus can be unsightly.

Beams are commonly supplied in many different sizes, and because a relatively close fit is required between a conventional beam hanger and the beam, a corresponding large number of beam hangers must be available to accommodate the wide range of beam sizes. This range of sizes increases costs of manufacturing and storing beam hangers, as well as complicating designs. Use of such hangers also requires relatively close tolerances to be maintained on dimensions of the beams to ensure a snug fit between flanges of the hanger.

U.S. Pat. No. 5,104,252 issued to Simpson Stong-Tie Company Inc. and in which the inventors are Colonias and Leak, discloses a hanger connection of a general type as described above. As can be seen, some hanger connections have relatively complex geometry, and spacings between some portions of the connections are critical to ensure a snug fit as above described, thus resulting in relatively costly hangers.

U.S. Pat. No. 5,295,754 (Kato) discloses a beam connector which has a generally vertical web or hook plate having a pair of projections extending axially from an outer edge of the plate. The projections also have relatively complex geometry and are received in complementary openings in a vertical column or post, the openings having similar complex geometry which cooperates with the projections to retain the web or plate against the column. The web is retained within an elongated vertical slit within an end face of a beam and thus is shielded from view. However, bolts pass through the beam and are retained in complementary openings or slits within the web to prevent axial movement of the beam with respect to the web. While this patent discloses a hanger in which most of the hanger is shielded from view when installed, the hanger itself is relatively complex and costly to manufacture, and requires the production of complex openings in an adjoining vertical post, and thus is costly to instal. In addition, care must be taken to ensure that the web is installed accurately within the beam and the openings are located accurately within the post to ensure proper fitting, which further increases cost of installation.

U.S. Pat. No. 4,981,388 (Becken et al) discloses a timber joining system in which two intersecting members can be joined together with a bolt which passes at an inclined angle through one member to be received within a female threaded opening passing transversely through a cylindrical member fitted within a second member. This would appear to be more suitable for relatively small members, for example small pieces of wood, such as used in furniture.

To the inventor's knowledge, there is no timber hanger which can be essentially completely concealed within heavy timber beams, at least when viewed from underneath, which can be easily adapted to accommodate a wide range of beam sizes, and can be produced and installed at relatively low cost due to relatively wide dimensional tolerances for manufacture of the beam and hanger, and for installation purposes.

SUMMARY OF THE INVENTION

The invention reduces the difficulties and disadvantages of the prior art by providing a beam hanger which is mechanically simple, can be produced for a relatively low cost, and can be installed in a wide variety of applications, thus simplifying manufacturing and inventory. The hanger can be installed using simple cutting equipment and techniques that do not require close control of dimensions, and when so installed, the hanger is invisible when viewed from beneath the joint, and invisible when viewed from the side. In addition, fasteners used to secure the hanger to the beams are also invisible when viewed from beneath. In addition, while one embodiment of the hanger will accommodate many beam-to-beam connections, a few relatively simple alternatives can be devised which will accommodate essentially all common beam-to-beam, beam-to-post and beam-to-wall connections.

A beam connection according to the invention is for connecting first and second members together with a beam hanger according to the invention. The first member has an upper face and a first joint face, the first joint face having a generally vertical slit intersecting the upper face, and a generally horizontal slit which is intersected by the vertical slit at a position remote from the upper face. The second member has a second joint face, at least one portion of the second joint face being adjacent and generally complementary to at least one portion of the first joint face. The beam hanger according to the invention comprises a generally vertical web, an upper flange, a seat and a connector. The generally vertical web is inserted into the vertical slit in the first joint face. The web is within a generally vertical axial plane and has upper and lower edges adjacent the upper face and the horizontal slit respectively of the first member. The web has an outer edge adjacent the first joint face. The upper flange extends from the upper edge of the web so that the upper flange contacts the upper face of the first member. The seat extends from the lower edge of the web and is inserted within the horizontal slit. The connector is for connecting the beam hanger to the second member and cooperates with the flange or the web and with fasteners to secure the beam hanger to the second member. In addition, the beam connection comprises a plurality of fasteners which pass through openings in the upper flange of the beam hanger to secure the upper flange to the first member. Preferably, the seat is parallel to the upper flange, and the seat can have an outer edge co-planar with the outer edge of the web.

In one embodiment, the first and second members are intersecting beams having generally co-planar upper faces, and the connector comprises a connecting flange being a co-planar and axially aligned extension of the upper flange. The connecting flange extends outwardly from adjacent the edge of the web and is aligned with the upper flange and is adapted to receive fasteners to connect to the second member.

In one alternative the first and second members are intersecting beams having vertically spaced apart upper faces. The connector comprises a connecting flange extending outwardly from adjacent the outer edge of the web, the connecting flange being generally parallel to, and spaced vertically from, the upper flange. As before, the connecting flange, as well as the upper flange is adapted to receive fasteners to connect to the second member.

In another alternative, the first and second members are a beam and a post or wall respectively, and the connector comprises a connecting flange connecting together the upper flange, the outer edge of the web and an outer edge of the seat. The connecting flange is disposed vertically and adapted to receive fasteners to connect to the post or wall.

In yet another alternative, the first and second members are intersecting beams inclined obliquely to each other and having co-planar upper faces. In this embodiment, the connector comprises a connecting flange being a co-planar extension of the upper flange, the connecting flange extending outwardly from the outer edge of the web and being inclined obliquely to the upper flange and adapted to receive fasteners to connect to the second member.

In a fifth embodiment, the first and second members are beams with the first beam inclined to the horizontal so as to be non-planar with respect to the second beam. The first member has a portion of an upper face thereof adjacent the first joint face generally co-planar with the upper face of the second member and in this embodiment the upper flange is shorter than in the first described embodiment. Alternatively, the first beam could have an obliquely inclined upper face intersecting the upper face of the second beam, and the upper flange and seat of the beam hanger are parallel to each other and inclined obliquely to the inner and outer edges of the web at an angle generally equal to angle of the upper face. In this embodiment, the connector comprises a connecting flange extending obliquely to the upper flange to be parallel and in contact with an upper face of the second member. As before, the upper flange and connecting flange receive fasteners to connect to the appropriate members.

The connector has other alternative shapes to accommodate a connection between other types of beams and posts.

A detailed disclosure following, related to drawings, describes several embodiments of the invention, which is capable of expression in structure other than that particularly described and illustrated.

DESCRIPTION OF THE DRAWINGS

FIG. 1 is a simplified fragmented perspective of a first embodiment of a beam hanger according to the invention shown spaced from a prepared end face of a first beam prior to installation of the hanger in the beam, FIG. 2 is a simplified fragmented perspective showing the hanger installed within the first beam and cooperating with an adjacent second beam to provide a beam connection, hidden portions of the hanger being shown in broken line, and fasteners being omitted for clarity, FIG. 3 is a simplified fragmented side elevation, partly in section, showing adjacent portions of the beam connection of FIG. 2 with fasteners in place and optional strengthening brackets added, FIG. 4 is a simplified fragmented top plan of the connection of FIG. 2, FIG. 5 is a fragmented end elevation of some critical portions of the beam hanger, FIG. 6 is a simplified fragmented side elevation, partially in broken outline, showing a second embodiment of a beam hanger according to the invention fitted in a first beam and to be used for connecting two beams having spaced apart upper faces, some alternatives being shown in broken line, the second beam being shown separated, FIG. 7 is an end view of the beam hanger and the first beam as used in the beam connection of FIG. 6, FIG. 8 is a simplified fragmented side elevation of a third embodiment of a beam hanger according to the invention for connecting a horizontal beam to a vertical post or wall, the hanger being shown connected to the post and separated from the beam, another alternative being shown in broken line, FIG. 9 is a simplified fragmented end elevation of the hanger of FIG. 8 shown connected to the post, FIG. 12 is a simplified, fragmented side elevation, partially in broken line, showing a fifth embodiment of a beam hanger according to the invention for connecting a first beam inclined obliquely to a second beam, the first beam being inclined to the horizontal but having an uppermost face portion co-planar with the second beam, the second beam being shown separated, FIG. 13 is a simplified end elevation of the hanger of FIG. 12 shown connected to the first beam, FIG. 14 is a simplified fragmented side elevation partially in broken line, showing a sixth embodiment of a beam hanger according to the invention for connecting a first beam to a second beam, the first beam and upper face thereof being inclined to the horizontal, and FIG. 15 is a simplified end elevation of the hanger of FIG. 14 shown connected to the first beam.

DETAILED DESCRIPTION

FIG. 1 through 5

Figure 10:
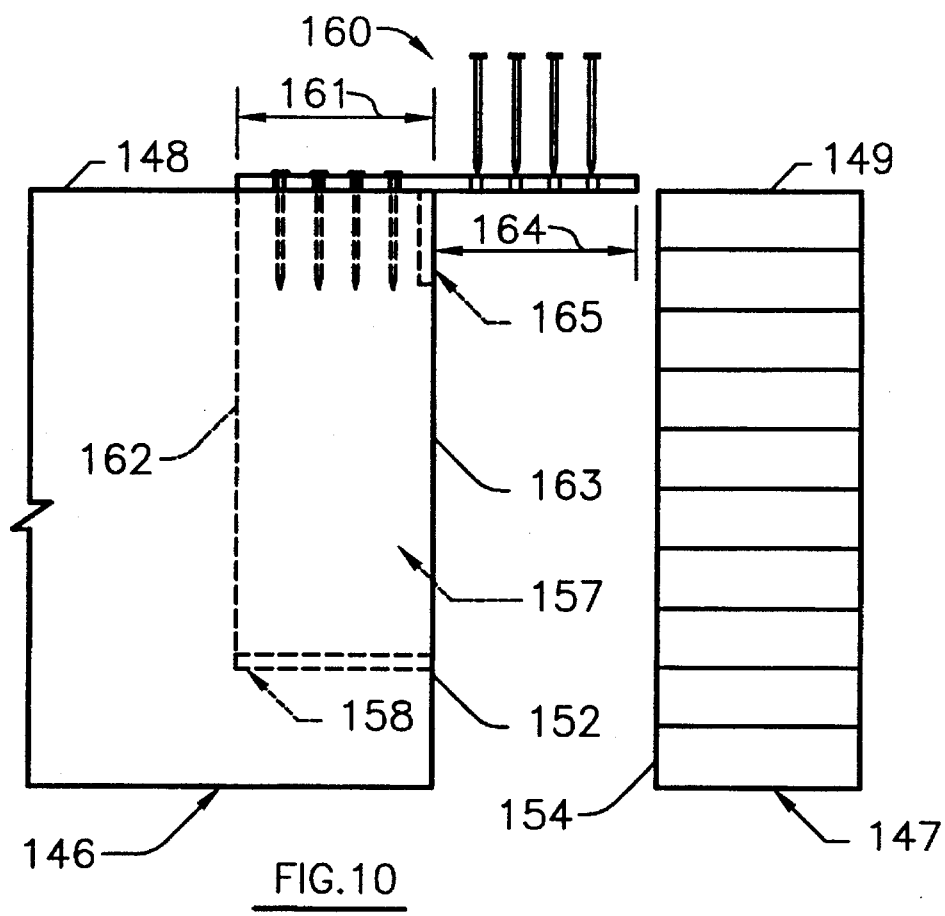
FIG. 10 is a simplified fragmented side elevation, partially in broken line, of a fourth embodiment of a beam hanger according to the invention for connecting one beam obliquely to another beam, with both beams having co-planar upper faces, the hanger shown fitted in the first beam, the second beam being shown separated.

A first embodiment 10 of a beam hanger according the invention comprises a generally vertical web 12, an upper member 13 and a seat 16. The web has parallel upper and lower edges 18 and 19 respectively, the upper edge 18 being shown in broken outline in FIGS. 1, 2 and 4. The web also has generally parallel inner and outer edges 20 and 21 respectively, the edges 18 and 19 being disposed perpendicularly to the edges 20 and 21 to define a generally rectangular web. Space between the edges 18 and 19 defines depth 22 of the web and space between the edges 20 and 21 defines length 23 of the web.

For simplicity, and for consistency in terminology with respect to alternative embodiments, hereinafter and in the claims, a portion of the member 13 extending between the inner edge 20 and the outer edge 21 of the web, i.e. a left hand portion as viewed in FIGS. 3 and 4, is termed an upper flange 14. Similarly, a portion of the member 13 extending outwardly or rightwardly from adjacent the outer edge 21 of the web is termed a connecting flange 15 and in this embodiment is preferably integral with the upper flange 14.

The upper flange 14 of the member 13 extends perpendicularly from the upper edge 18 of the web and has a plurality of openings 24 to receive fasteners 25 shown only in FIG. 3. The seat 16 extends perpendicularly from the lower edge 19 of the web and has generally parallel inner and outer edges 27 and 28 and generally parallel side edges 29 and 30, the edges 27 and 28 being perpendicular to the edges 29 and 30 to define a rectangular seat. The outer edge 28 of the seat is generally co-planar with the outer edge 21 of the web, and, in this example, the inner edge 27 of the seat is generally co-planar with the inner edge 20 of the web. Alternatively, the inner edge of the seat could be located inwardly of the edge 20 with respect to the beam at an alternative location 27.1 (shown in broken outline in FIG. 3 only). Space between the edges 27 and 28 defines length 31 of the seat, and space between the side edges 29 and 30 defines width 32 of the seat.

The seat 16 is parallel to the upper flange 14, when viewed in a side elevation as shown in FIG. 3, and when viewed axially as in FIG. 5, that is viewed along a general vertical axial plane 33 coincident with a central plane of the web 12.

The member 13 and the flange 14 have an inner edge 34 and the member 13 has an outer edge 35, in this embodiment the edge 34 being generally co-planar with the edge 27 of the seat although this is not required. The member 13 and the flange 14 also have side edges 36 and 37 disposed parallel to each other and perpendicularly to the edges 34 and 35 so as to define a rectangular member 13. Space between the edges 34 and 35 defines length 39 of the member, and space between the edges 36 and 37 defines width 40 of the member or flange. Thus, the upper flange and the seat have respective widths defined by transverse spacing between respective side edges thereof. As best seen in FIG. 5, side edges of the seat are disposed inwardly of side edges of the upper flange so that the width 40 of the upper flange is greater than the width 32 of the seat. Thus, side edges of the flange "overhang" the seat for reasons to be described.

As best seen in FIG. 5, the web 12 has a thickness 42 as measured transversely to a vertical axial plane 33, and the seat has a thickness 46 as measured generally parallel to the axial plane, the thicknesses of the web and seat being generally equal. The first embodiment 10 is preferably fabricated by welding the flange 14 and the seat 16 to opposite edges of the web 12 to provide joints therebetween with relatively sharp corners between intersecting surfaces of the web, the flange and the seat. For example, where the upper edge 18 of the web intersects the flange there is a negligible radius therebetween, and this is attained by providing substantial weld preparation for the edge 18. In other words, the upper edge 18 is first ground or cut to assume a V-shape to provide an approximately 90 degree corner running centrally along the axial plane 33. Thus, when the edge 18 is welded, weld beads fill any voids between the web and the flange, and produce relatively sharp corners between the web and flange. Similarly, when the lower edge 19 of the web intersects the seat 16, there is a similar relatively sharp inwardly facing corner adjacent opposite lower edges of the web. It is important to avoid production of a heavy weld bead which would produce radiused or filleted surfaces extending between adjacent perpendicular surfaces of the flanges and web, and the seat and web, for reasons to be described. It can be seen that the flange 14 and the seat 16 are non-releasably connected to the web 12 to provide a secure connection therewith to resist forces imposed thereon. Thus the flange and seat are essentially permanently connected to the web and cannot be easily separated from each other without damaging the hanger.

The first embodiment 10 of the beam hanger is used to connect together first and second structural members, which in this instance are generally rectangular-sectioned timber beams which typically have similar depths, usually in the range of about 6–24 inches (about 150–600 millimeters). In the present example as seen in FIGS. 2 and 4, the first and second beams 51 and 52 intersect each other perpendicularly and have upper faces 53 and 54 which are flat and generally co-planar with each other. The first beam has a first joint face 57 disposed generally perpendicularly to the face 53 and side faces of the beam 51 and, as will be described, is cut to receive the beam hanger.

After cutting, the face 57 has a generally vertical slit 59 intersecting the upper face 53, and a generally horizontal slit 60 which is intersected by the vertical slit at a position or intersection 62 remote from the upper face. The slits 59 and 60 are defined by pairs of spaced apart vertical and horizontal slit faces respectively. The vertical slit 59 has an axial depth 64 as measured vertically along the face 57, and an axial length 65 as measured horizontally along the beam and perpendicularly to the joint face 57. The horizontal slit 60 has a transverse breadth 67 and an axial length 68 as measured along and perpendicularly to the face 57 respectively. The lengths 65 and 68 may be generally equal although this is not critical provided they are sufficiently long. The slits 59 and 60 have generally similar widths, which widths are equal or slightly greater than the similar thicknesses 42 and 46 of the web 12 and seat 16 respectively. The depth 64 of the vertical slit 59 is generally equal to or slightly larger than the depth 22 of the web, and the transverse breadth 67 of the horizontal slit 60 is generally equal to the width 32 of the seat. Similarly the lengths 65 and 68 of the slits 59 and 60 respectively are generally equal to the lengths 23 and 68 of the web and seat respectively.

Thus, the web 12 and seat 16 can be received within the slits 59 and 60 as best seen in FIGS. 2 through 4. It is not necessary that the hanger slides easily into the slits and it may be necessary to use a hammer to drive the hanger to be fully seated within the slit, but care should be taken to ensure the beam does not spilt. In any event, it is important that the lengths 65 and 68 are no shorter than the lengths 23 and 31 of the web and seat to permit the hanger to be received fully in the slits so that the outer edges 21 and 28 of the web and seat respectively can be flush with the joint face 57. Clearly, when the hanger is installed, the upper and lower edges 18 and 19 of the web are generally adjacent the upper face 53 of the beam and the slit 60 respectively.

As best seen in FIG. 4, the first and second beams 51 and 52 intersect each other at 90 degrees as viewed in top plan, and a portion of a vertical side face of the second beam contacts the face 57. In this particular instance, the beams are shown to have an equal depth, and thus the portion of the side face of the beam 52 contacted by the joint face 57 serves as a second joint face 72 which is adjacent and generally complementary to the first joint face 57. As will be described, in other configurations, the first joint face may not be completely in contact with the second beam or member 52.

For high load applications, optional transversely disposed triangular strengthening gussets or brackets can be provided to extend between a lower surface of the upper flange 14 and adjacent portions of the web 12, as shown in broken outline at 80 in FIGS. 3 through 5 only. Clearance for the brackets is provided in the joint face 57 to allow the faces 57 and 72 to contact each other.

The connecting flange 15 is shown to extend from the first joint face across a portion of the upper face 54 of the second beam, and thus the connecting flange 15 is a co-planar and an axially aligned extension of the upper flange 14. The connecting flange has a plurality of openings 77 which are adapted to receive fasteners 78 to connect the hanger to the second member. Thus, while the connecting flange 15 and the upper flange 14 are co-planar and integral with each other as shown, this is appropriate only for first and second members which have generally co-planar upper faces as shown. The connecting flange 15 thus serves as a connector for connecting the beam hanger 10 to the second member, and alternative connectors or connecting flanges are used for alternative beam connections as will be described with reference to FIGS. 6 through 15. For convenience of terminology, the fasteners 25 which are retained in the first beam 51 are termed "primary" fasteners, and the fasteners 78, which are received in the second member 52 are termed "secondary" fasteners. The primary and secondary fasteners can be identical types of fasteners, e.g. screws or nails, depending upon engineering requirements.

OPERATION

To assemble the beam connection of FIG. 2, the first joint face 57 or end face of the first beam must be generally complementary to the second joint face 72 of the second beam. Usually, the face 57 is perpendicular to the axis of the beam and may require no further work. If the beam must be trimmed to length, it is important that the face 57 is perpendicular to the axis and faces of the beam and generally flat. The vertical and horizontal slits 59 and 60 must now be cut into the face by using one of several methods. If desired, the location of the slits can be marked on the face after transferring measurements of the hanger from suitable data, for example the top face, the bottom face and/or side faces of the beam. This is time consuming and subject to error. A preferred approach would be to apply a dye or other marking ink to the inner edges 20 and 27 of the web and seat respectively. Before the dye or marking ink dries, the hanger is positioned accurately against the joint face 57, so that ink from the inner edges is transferred into the end face to mark on the end face the desired location of the hanger. This must be done carefully as it will determine the accuracy of later saw cuts which produce the slits 59 and 60 where they penetrate the face 57. Alternatively, the inner edges 20 and 27 can be sharpened to a symmetrical V-shape, and the location of the edges can be transferred on to the joint face 57 by lightly hammering the outer edges 21 and 28 of the web and seat, so that the V-shapes of the edges are impregnated into the face 57. In this way, the dye and/or ink can be eliminated. The position of the slit 59 where it penetrates the upper face 53 is marked by using a right-angled guide extending from the face 57 along the upper face 53.

A chainsaw is usually used to produce the slits 59 and 60 by carefully cutting into the end face to produce the slits in the desired places based on the marks on the end face. Clearly, width of the slits 59 and 60 is dependent on kerf or width of cut of the chainsaw, which is selected to be the same or slightly greater than the thicknesses 42 and 46 of the web and seat. Preferably, the saw is guided accurately during the cutting, so as to produce slits having essentially plane inner faces which permit reasonably easy entry of the web and seat into the appropriate slits. Alternatively, if cutting of the slits is poorly controlled and resulting faces of the slits are non-planar, the kerf should be somewhat larger than the thickness of the web and seat so as to facilitate insertion of the hanger. If the faces of the slits are non-planar and/or the kerf is too narrow relative to the hangar thickness, excessive interference will occur when driving the hanger into the slits, and thus care should be taken to ensure that wood surrounding the slits is not split excessively due to excessive force being used to drive the hanger into the slits.

Clearly, the slits 59 and 60 intersect each other perpendicularly, and a relatively sharp corner is generated between intersecting faces of the slits. Similarly, the slit 59 intersects the upper face 53 of the beam, generating similar sharp corners between surfaces of the slit and face. As previously stated, sharp corners are provided between intersecting surfaces of the web, the seat and the upper flange, with negligible radii or fillets therebetween, thus reducing chances of any interference between the corner of the slits in the beam, and the joins in the web. In contrast, because conventional I-beams as used in structural applications are generally manufactured by rolling, a generous radius is provided between the flanges of the beam and the web which would interfere with edges of the cuts herein. In addition, surfaces of the flanges of some types of conventional I-beam taper outwardly, and thus have a varying thickness across their width, which also contrasts with the constant thickness of the seat of the present invention. Also, the flanges and webs of a conventional I-beam usually have dissimilar thicknesses for strength reasons. Consequently, in most cases, it would be inappropriate to use a short portion of a conventional I-beam as a substitute for fabricating the beam hanger as described above.

For normal applications, for use with relatively heavy duty laminated beams of depth of between about 6 inches and 24 inches (about 150 millimeters and 600 millimeters), it is anticipated that the thicknesses 42 and 46 of the web and seat would be between approximately ¼ inch and ⅜ inch (approximately 6.3 millimeters and 9.5 millimeters). This is within the range of normal chainsaw kerfs. For relatively light loads, the thicknesses 42 and 46 can be correspondingly reduced, possibly to be ⅛ inch and 3/16 inch (approximately 3.2 millimeters and 4.7 millimeters). For relatively small web and seat thicknesses, the inner edges 20 and 27 of the web and seat respectively can be sharpened sufficiently to allow the hanger to be driven into the end face of the beam without first cutting the slits. Clearly, the beam would have to have straight grain to ensure that the web and seat were accurately aligned with respect to axis of the beam after being driven into the face. It is also important that any splitting of the beam beyond the web and seat is minimal.

The web and seat of the hanger are first retained in the slits 59 and 60 respectively by securing the hanger adjacent the end face using a few of the fasteners 25 passing through the openings 24 in the flange 14. If the slits are correctly located, when the hanger has been correctly fitted, a lower surface of the upper flange 14 is held closely adjacent the upper face 53 of the beam, thus ensuring a snug fit, although a small clearance between the flange 14 and face 53 is not critical. The adjacent portion of the beam is then supported against the second beam by resting the connecting flange 15 against the upper face 54. When the beams are correct positioned relative to each other, fasteners can be inserted in the appropriate openings 77 in the connecting flange 15, and more fasteners can be inserted through additional openings 24 in the flange 14.

It is noted that the side edges 29 and 30 of the seat are located inwardly of adjacent vertical side faces of the beam 51. Preferably, there is adequate material between the side faces of the beam and side edges of the seat to prevent the seat from being exposed should the wood fragment or crack when the beam be subjected to excessive loads. In laboratory tests, it has been found that one mode of failure of this type of hanger connection is due to compression of wood above the seat, which failure can be eliminated if adequate precautions are taken when selecting size of the seat and thickness of the beam. Clearly, as the joint face 57 is completely masked by the second beam, the only portions of the hanger that are visible are the upper flange 14 and integral connecting flange 15. If the beam connection is mounted high in a ceiling, or if the flanges are covered by other members, clearly the embodiment 10 is invisible from persons located below the beam connection.

ALTERNATIVES

FIGS. 6 and 7

A second embodiment of the beam hanger is designated 85 and has some portions which resemble corresponding portions of the first embodiment. These similar portions include a generally vertical rectangular web 87 and a horizontal rectangular seat 88 which can be essentially identical to the corresponding web 12 and seat 16 of FIGS. 1 through 5. The second embodiment 85 also has an upper flange 91 which is connected to and extends along an upper edge 93 of the web 87 and thus resembles the upper flange 14. The flange 91 is disposed between outer and inner edges 94 and 95 of the web and serves as a complete upper member of the hanger and thus the integral and aligned connecting flange 15 of FIGS. 1 through 5 is eliminated.

The second embodiment 85 is for connecting together first and second members which are perpendicularly intersecting beams having vertically spaced apart upper faces as will be described. The portions of the second embodiment of the hanger as described above cooperate with a joint face or end face 92 and an upper face 98 of the first member, namely a first beam 96, in a manner essentially identical to that described with reference to the hanger embodiment 10 and the first beam 51 of FIGS. 1 through 5. Thus, the end face 92 of the beam 96 is perpendicular to faces of the beam and is provided with slits to receive the web and seat and further description is deemed unnecessary.

An alternative connecting flange 97 is substituted for the eliminated flange 15 and extends outwardly from generally adjacent the outer edge 94 of the web and is generally parallel to but spaced downwardly from the upper flange 91 by a spacing 99. An interconnecting flange 100 is secured to the outer edge 94 of the web and has an upper end 102 connected to the upper flange 91 adjacent the edge 94, and a lower end 103 connected to the connecting flange 97 adjacent the edge 94. The interconnecting flange is designed to provide a sturdy connection between the flange 97, the flange 91 and the web. Clearly, the flanges 91, 97 and 100 could be fabricated to be integral with each other by forming a strip of suitable material into a Z-shape after which the flanges 91 and 100 are secured to the web. The connecting flange 97 has openings 101 to receive undesignated fasteners for securing to an upper face 104 of the second member, i.e., a second beam 105 which is disposed perpendicularly to the first beam 96 in plan view, not shown. It can be seen that vertical spacing 107 between the upper faces 98 and 104 of the beams is equal to the spacing 99 between the flanges 91 and 97 which defines length of the interconnecting flange 100. For additional strength in an alternative, the connecting flange 97 can also be connected to the web 87 by a pair of transversely disposed strengthening triangular brackets 109 which extend beneath and between the connecting flange and the web, as best seen in FIG. 7. These brackets would require a complementary clearance recesses in the joint face 92. Alternatively, an axially disposed central triangular bracket, shown in broken outline at 111, can extend axially between the interconnecting flange 100 and the connecting flange 97.

In some designs, an alternative spacing 107.1 between the faces 98 and 104 (shown at 104.1) of the beams can be equal to an alternative spacing 99.1 between the seat 88 and the upper flange 91. In this case the separate connecting flange 97 can be eliminated, and an alternative connecting flange 97.1 substituted which extends from the seat 88 and contacts an upper face 104.1 of the beam 105 (shown in an alternative location). This alternative is an integral co-planar and axially aligned extension of the seat 88 as shown in broken outline. In this alternative the interconnecting flange 100 would extend to a lower end 103.1 thereof to connect with an upper surface of the integral connecting flange 97.1 and thus could be a L-shape to be integral with the upper flange 91 only. In some applications of this alternative, the interconnecting flange 100 can be eliminated and sufficient strength is obtained by having the flange 97.1 integral with the seat 88.

Two other alternatives are envisaged in which the upper face 104 of the second beam 105 is spaced either below or above the upper flange 91, i.e. below or above the face 98 of the beam. In the first of these two alternatives, the upper surface of the beam 105 is located at an alternative location 104.2, which is located in this example below the seat 88, and can also be below a lower face of the beam 96. In this alternative the interconnecting flange 100 extends to an alternative lower end 103.2 thereof. An alternative connecting flange 97.2 extends from the end 103.2 and is secured to the alternative face 104.2 of the beam. In the second of two main alternatives, an alternative position of the upper face of the beam 105 is shown at 104.3 which is disposed above the face 98. In this case, an alternative interconnecting flange 100.3 extends from an end of the upper flange 91 adjacent the edge 94 of the web so as to be generally co-planar with the edge 94 but is not connected to the edge 94. An alternative central bracket 111.1 extends between the upper flange and the connecting flange 100.3 to strengthen the connection therebetween. As before, the upper flange 91, the connecting flange 100.3 and the alternative connecting 97.3 can be formed into a Z-shaped integral connection. Clearly, in some alternatives of this embodiment, small portions of the hanger may be visible from below.

Yet a further alternative to this general structure is envisaged in which the upper faces of the two intersecting beams are non-parallel. In this further alternative, as seen only in FIG. 7, the face of the second beam is designated as 104.4 and inclined at an angle 112 to the horizontal, and thus also to the face 98 of the first beam which is also horizontal. In this embodiment, the interconnecting flange is designated 100.4 which extends above the upper flange 91 similarly to the flange 100.3, and has an upper end 102.4 from which an alternative laterally inclined connecting flange 97.4 extends. This type of beam hanger is necessary in some style of roof designs where beams have upper surfaces inclined to the horizontal.

Clearly, other alternatives are envisaged in which the inclined face 104.4 of the second beam could be level with or below the face 98 of the first beam, or below the seat 88 similarly to the alternative shown at 97.2. All these embodiments are considered to utilize the basic concept of the invention in which first and second members are intersecting beams having vertically spaced apart upper faces and the beam hanger has a connector which comprises a connecting flange spaced vertically from the upper flange and adapted to receive fasteners to connect to the second member. Clearly, in some embodiments the connecting flange can be parallel to the upper flange, and in other instances can be inclined to the upper flange.

FIGS. 8 and 9

A third embodiment 115 of a beam hanger according to the invention is for securing a first member, namely a generally horizontal beam 116, to a second member, namely a generally vertical post or wall 118. For simplicity, hereinafter and in the claims, the second member 118 is assumed to be a vertical post, although any structural member with a vertical surface could be substituted for the post. The third embodiment has a vertical rectangular web 120 and a horizontal rectangular seat 122 which generally resemble the webs and seats of the previously described embodiments. The third embodiment has an upper flange 124 which resembles the upper flange 91 of the second embodiment 85 in that the flange 124 serves as the upper member of the hanger and has an outer edge 126 generally adjacent an outer edge 127 of the web 120.

The third embodiment differs from the previous two embodiments by having an alternative connecting flange 129 which is a vertically disposed rectangular plate connecting together the outer edge 126 of the upper flange 124, the outer edge 127 of the web 120, and an outer edge 123 of the seat 122. The connecting flange 129 has an upper edge 130 secured to the upper flange 124, and a lower edge 131 secured to the outer edge 123 of the seat. As seen in FIG. 9, width of the flange 129, as defined by length of the lower edge 131, may be greater than width of the seat 122, as defined by length of the edge 123 so the flange may "overhang" the seat. Similarly, side edges 132 and 133 of the connecting flange intersect undesignated side edges of the upper flange 124, which are spaced outwardly from undesignated side edges of the seat 122. The connecting flange 129 has a plurality of openings 134 to receive fasteners 135 passing into the post 118. Clearly, the connecting flange 129 is plane and complementary to the end face 119 of the beam 116, and a complementary joint face 136 of the post.

The joint face 119 of the beam 116 is prepared to produce undesignated slits complementary to the web and seat in a manner similar to that described with reference to FIGS. 1 through 5. Preferably, clearance recesses 142 are also provided in the end face 119 to provide clearance for ends of the fasteners 135 to permit flush fitting of the joint face 119 against the connecting flange 129. In this arrangement, edges of the connecting flange 129 would be visible in narrow gaps between the end face 119 and the joint face 136. If desired, the end face 119 of the beam could be recessed to receive not only the ends of the fasteners 135, but also the connecting flange 129, so that the hanger would not be visible from the side or underneath.

In an alternative, the upper flange 124 can be extended axially beyond the edge 126 to provide an alternative bracket 138, shown in broken outline, which is a relatively short, integral, co-planar axially aligned extension of the upper flange. The post would then require a generally horizontal complementary slit 140 disposed in the second joint face to be generally adjacent and aligned with the upper flange 124. The bracket 138 extends outwardly from adjacent the outer edge of the web and is received snugly in the complementary slit 140 to provide additional support for the hanger.

The third embodiment 115 can be installed in the joint in one of two ways, either by first securing the hanger to the end face 119 of the beam 116 as previously described, or alternatively by securing the hanger to the joint face 136 of the post 118. In this first approach, because the end face of the beam obscures the fasteners 135, an alternative arrangement of fasteners is preferred, for example captive nuts could be secured to a surface of the connecting flange 129 aligned with threaded or clearance openings in the flange. Each openings receive a bolt which has a sufficient length to pass through the post and to be retained in the nut, which arrangement permits application of torque to the bolts while securing the hanger to the post. This presents some difficulties which may be unavoidable in some circumstances. The alternative approach is considered to be easier in most instances by first securing the hanger to the post with the fasteners 135 as shown in FIG. 8, and then to insert the web and seat into the slits on the end face of the beam, for installing the first beam.

In alternatives, not shown, the beam 116 could be inclined to the horizontal where it intersects the post. In this alternative, the beam is cut to provide a horizontal upper face portion, or the upper flange 124 could have an upper surface inclined at an angle to be complementary to an upper face of the inclined beam. This alternative is not shown but bears some resemblance to alternatives shown in FIGS. 12 through 15.

Figure 11:
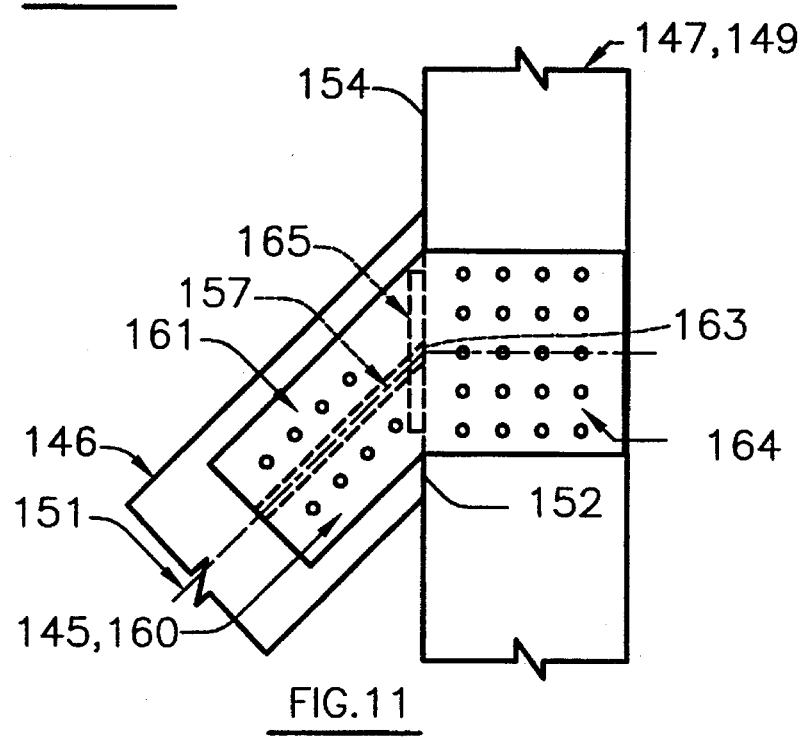
FIG. 11 is a simplified, fragmented top plan view of the completed beam connection of FIG. 10.

FIGS. 10 and 11

A fourth embodiment 145 of a hanger according to the invention is for connecting together first and second members or beams 146 and 147 respectively which are horizontally disposed, intersecting beams and are inclined obliquely to each other as viewed in the top plan of FIG. 11. The beams 146 and 147 have co-planar upper faces 148 and 149 respectively, as seen in FIG. 10. Because the beams intersect each other obliquely, to ensure that joint faces of the beams are complementary to each other, the beam 146 has an end face or first joint face 152 cut obliquely to a longitudinal beam axis 151 as shown in FIG. 11 to be complementary to a side face or second joint face 154 of the beam 149. Clearly, the end face 152 is disposed perpendicularly to the upper face 148 of the beam, assuming the face 154 is vertical.

The fourth embodiment 145 has a vertical rectangular web 157 and a horizontal rectangular seat 158 which are generally similar to those as previously described. The end face 152 of the first beam is prepared in a manner generally similar to that of the previous embodiments except that horizontal and vertical slits to receive the web and seat are cut generally obliquely to the end face, so as to be aligned axially with the beam 146. This requires additional skill in cutting the slits and consequently additional saw guidance tooling is preferred.

The fourth embodiment 145 has an upper member 160 comprising an upper flange 161 extending from an inner edge 162 of the web to a plane containing an outer edge 163 of the web and the complementary joint faces 152 and 154. To accommodate the oblique angle between the beams, the upper member 160 also comprises a connecting flange 164 which is integral with and inclined obliquely to the upper flange 161 at an angle complementary to the angle between the beams as shown in FIG. 11. This connecting flange 164 is a co-planar extension of the upper flange 161 and extends obliquely outwardly from the outer edge 163 of the web and is inclined obliquely to the upper flange as best seen in FIG. 11. Both the upper flange 161 and the connecting flange 164 have undesignated openings to receive undesignated fasteners to connect to the first and second beams respectively. As previously described, in some applications a pair of transversely disposed triangular strengthening brackets 165, shown in broken outline, can be fitted to extend between the web 157 and the upper flange as shown.

Similarly to the previously described embodiments, the upper faces 148 and 149 of the beams could be spaced apart vertically, in which case the connecting flange 164 would be secured to an interconnecting flange, not shown, generally similar to the flange 100 of FIGS. 6 and 7 so that the upper flange and connecting flanges could be interconnected and non-planar. This alternative is also not shown.

FIGS. 12 and 13

A fifth embodiment 170 of a hanger according to the invention is for connecting together perpendicularly or obliquely intersecting first and second members, namely first and second beams 171 and 172 in which the first beam is inclined to the horizontal so as to be non-planar with respect to the second beam. The first beam 171 has a main longitudinal axis 174 inclined to the horizontal as shown, and an upper face 175 which is parallel to the axis. The beam 171 has a vertical end face, serving as a joint face 177, which is thus inclined obliquely to the axis 174 and is generally complementary to a side face of the second beam 172 which serves as a second joint face 179.

The second beam 172 has an upper face 183 disposed perpendicularly to the face 179 and thus is generally horizontal. Thus, the face 175 and face 183 are inclined to each other, that is they are non-planar, and some difficulties can arise with this type of beam connection. To overcome such difficulties, an uppermost portion 181 of the upper face 175 of the first beam, which is adjacent the first joint face 177, is cut so as to be generally co-planar with the horizontal upper face 183 of the beam 172. Because the face 177 is vertical, and the portion 181 is horizontal, the portion 181 and the face 177 are perpendicular to each other. This enables a hanger which is generally similar to the first embodiment 10 to be used in this application if the portion 181 of the upper surface of the beam is approximately equal to, or at least no smaller than, size of the upper flange 14 of the embodiment of FIGS. 1 through 5. Typically, the portion 181 can be relatively small, and thus preferably the fifth embodiment 170 has a smaller upper flange 186 substituted for the normal sized flange 14 of FIGS. 1–5. Preferably the flange 186 is approximately equal to size of the portion 181 which results in a relatively small upper flange, which is less visible than a larger flange and is sufficient to accept necessary fasteners.

Similarly to the previously described embodiments, the embodiment 175 has a vertical web 188, and a horizontal rectangular seat 189 secured adjacent a lower edge of the web. The web has an outer edge 191 generally co-planar with the end face 171 and a corresponding outer edge 192 of the seat. The seat 189 is usually of a similar size to the seat 16 of FIGS. 1 through 5, assuming that loads are similar. Thus, the seat extends inwardly from the outer edge of the web a greater distance than the upper flange, and thus the web has an inner edge 194 which extends obliquely from an inner edge 196 of the upper flange 186 to an inner edge 197 of the seat so that the web 188 is generally trapezoidal in shape.

Thus, it can be seen in FIG. 12 that the upper flange 186 has an axial length less than the seat 189, but as seen in FIG. 13, the upper flange has a transverse width greater than transverse width of the seat 189. It is noted that the side edges of the upper flange coincide with side edges of the first beam 171 and that adequate material is provided between side edges of the beam and side edges of the seat. Optional transversely disposed triangular brackets 199 can be provided to extend between the upper flange 186 and the web 188 to increase stiffness between the web and flange as previously described.

Similarly to the first embodiment 10, the fifth embodiment 170 has a connecting flange 202 being a co-planar and axially aligned extension of the upper flange 186. The connecting flange extends outwardly from adjacent the outer edge 191 of the web, and is aligned with the upper flange and adapted to receive fasteners passing through complementary undesignated openings to connect to the second beam 172.

The fifth embodiment 170 of the hanger is fitted in slits in the beam 171 generally similarly to the previously described embodiments. Because the inner edge 194 is inclined obliquely to the outer edge of the web, the inner edge 194 of the hanger embodiment 170 cannot be used as a template to provide suitable marks for indicating the location of the vertical and horizontal slits in the joint face 177. Instead, the outer edge 191 of the web and the outer edge 192 of the seat are placed against the end face to serve as templates to mark positions of the slits on the joint face 177. In addition, care must be taken when cutting the slit for the seat 189 because the cutting occurs in a plane inclined obliquely to grain of the beam which may increase difficulties.

Because the fifth embodiment 170 is functionally essentially identical to the first embodiment 10, clearly the fifth embodiment can be used to secure two perpendicularly intersecting horizontally disposed beams. Because the upper flange 186 is smaller than the upper flange 14 of FIGS. 1–5, and the web 188 is also smaller than the web 12 of FIGS. 1–5, less material is used which could result in lower production costs. In addition, because the upper flange is smaller it is less visible from above, and will be easier to mask, thus improving the aesthetics of the joint.

Similarly to the previously described embodiments, the face 183 could be spaced vertically from the face 181, and this could be accommodated by providing an interconnecting flange generally similar to the flange 100 of FIGS. 6 and 7. This alternative is not shown. Also, as previously described with reference to FIGS. 8 and 9, the inclined beam can be accommodated in other alternatives described herein.

In an additional alternative similar to the first embodiment, the seat 189 has an alternative inner edge 197.1 which is disposed inwardly of the inner edge 194 of the web where it contacts the seat. This has applications where for engineering reasons, a larger bearing area of seat is required to support loads of the beam, and, for economy, a web can have a shorter length where it contacts the web.

FIGS. 14 and 15

A sixth embodiment 210 of a hanger according to the invention is for connecting together first and second members, namely perpendicularly intersecting first and second beams 211 and 212 in which the first beam is inclined to the horizontal so as to be non-planar with respect to the second beam, in a manner similar to that shown with reference to FIGS. 12 and 13. Thus, the first beam 211 has a main longitudinal axis 214 and an upper face 215 inclined to the horizontal as shown in FIG. 14. In contrast with the beam 171 of FIG. 12, the upper face 215 of the beam 211 extends as an inclined plane to intersect an end face there, of serving as a first joint face 217. Thus, the faces 215 and 217 are inclined to each other at an angle 219 which is complementary to angle of inclination of the beam to the horizontal. The second beam 212 has a horizontal upper face 221, and a vertical side face 222, which serves as a second joint face. Thus, the upper face 215 of the first beam is obliquely inclined and intersects the generally horizontal upper face 221 of the second beam.

The sixth embodiment 210 has a vertical web 225 having parallel inner and outer edges 226 and 227 which are parallel to the joint face 217, and upper and lower edges 228 and 229 which are parallel to the upper face 215. Consequently, as illustrated, the web is a parallelogram which differs from the previous rectangular webs 12, 87, 120 and 157, and the trapezoidal web 188, but other shapes are possible.

The sixth embodiment 210, as illustrated, also has a rectangular seat 233 having an outer edge 234 which is coplanar with the face 217, and an inner edge 235 which is parallel to the edge 234 and adjacent the inner edge 226 of the web. Thus, the seat is sloping, i.e. inclined to the horizontal so as to be parallel to the upper face 215 of the beam, and is perpendicular to the web 225 as seen in FIG. 15. This is the only embodiment shown with a sloping seat, but other embodiments could be modified to have a sloping seat to accommodate inclined beams.

The sixth embodiment 210 has an upper member 238 comprising an upper flange 240 extending from the upper edge 228 of the web. Thus, the upper flange and the seat are parallel to each other and inclined obliquely to the inner and outer edges of the web at complementary angles dependent on the angle of the upper face. The upper flange has an inner edge 242 adjacent the inner edge 226 of the web. The upper member 238 further comprises a connecting flange 245 which extends outwardly from the outer edge 227 of the web and is inclined obliquely to the upper flange at an angle thereto so as to be parallel and in contact with the upper face 221 of the second member. As best seen in FIG. 15, the connecting flange 245 has side edges 247 and 248 which are within vertical planes containing side edges 251 and 252 of the upper flange 240 and thus the upper member 238 can be made by bending a rectangular sheet of metal at the appropriate angle 244, depending on the angle of the face 215. Similar to the previously described embodiments, the upper flange and connecting flange 240 and 245 respectively have undesignated openings to receive undesignated fasteners for securing the respective flanges to the first and second beams. Similarly to the previously described embodiments, the top flange may be narrower than the beam, and transverse triangular brackets 257 can be secured to the edge 227 and the upper flange to strengthen the connection between the web and the upper flange.

Because the seat 229 is parallel to the axis 214, the saw cut to produce the slit for the seat 229 is generally aligned with the grain of the beam, which contrasts with the fifth embodiment as shown in FIG. 12, in which the saw cut is inclined obliquely to the grain. However, the saw cut is inclined obliquely to the face 217 which can cause some problems in accurately cutting the slit, and thus guidance tooling may be appropriate.

Additional alternative structures are envisaged in which the upper face 221 of the second beam is spaced vertically with respect to an intersection of the faces 215 and 217 of the first beam. This vertical spacing could be accommodated by providing an interconnecting flange which is preferably integral with the upper flange and generally similar to the flange 100 of FIGS. 6 and 7 as previously described. As shown in some of the earlier embodiments, for high load applications, transversely disposed triangular strengthening brackets, or one or more axially disposed triangular brackets can be disposed between the connecting flange and the interconnecting flange and/or vertical web as required, following conventional engineering practise.

In summary, it can be seen that at least six main embodiments as described above have a support structure for inserting into complementary vertical and horizontal slits in the first joint face of the first beam, the support structure being a vertical web and a horizontal seat disposed below the web. In addition, all support structure has an upper flange for connecting to the upper face of the first member to provide a secure connection thereto to prevent axial movement of the beam relative thereto while the seat supports weight of the first beam. In addition, each of the embodiments has a connecting flange which serves as a connector for connecting the beam hanger to the second member so as to support the first member against the second member. The connector cooperates usually with the upper flange, and is commonly integral therewith for manufacturing simplicity. Alternatively, the connector can cooperate directly with the seat or with an interconnecting flange which is secured to the web. Sometimes additional transversely or axially disposed triangular strengthening brackets are needed, depending on the application. The connector also cooperates with fasteners which pass through openings in the connector to secure the beam hanger to the second member. In all instances, a plurality of fasteners pass through openings in the upper flange of the beam hanger to secure the upper flange to the first member. Clearly, alternative connectors can be devised for connecting the beam hanger to other second members, which have joint faces complementary to the first beam, and an upper face adapted to receive the connector secured thereagainst.

I claim:

1. A beam connection assembly comprising:
   (a) a first member having an upper face, a lower face opposite to the upper face, and a first joint face, the first joint face having a generally vertical slit intersecting the upper face, and a generally horizontal slit which is intersected by the vertical slit at a position remote from the upper and lower faces, the horizontal slit being defined in part by a pair of spaced apart horizontal slit faces,
   (b) a second member having a second joint face, at least one portion of the second joint face being adjacent and generally complementary to at least one portion of the first joint face,
   (c) a beam hanger comprising:
      (i) a generally vertical web inserted into the vertical slit in the first joint face, the web being within a generally vertical axial plane and having upper and lower edges adjacent the upper face and the horizontal slit respectively of the first member, the web having an outer edge adjacent the first joint face,
      (ii) an upper flange non-releasably connected to and extending from the upper edge of the web so that the upper flange contacts the upper face of the first member,
      (iii) a seat non-releasably connected to and extending from the lower edge of the web and inserted within the horizontal slit, the seat having a lower face which is concealed from view by the first member,
      (iv) a connector for connecting the beam hanger to the second member, the connector being non-releasably connected to the upper flange or the web and cooperating with secondary fasteners to secure the beam hanger to the second member, and (d) a plurality of primary fasteners passing through openings in the upper flange of the beam hanger and extending into the first member to secure the upper flange to the first member.

2. A beam connection assembly as claimed in claim 1, in which:

(a) the seat is parallel to the upper flange.

3. A beam connection assembly as claimed in claim 1, in which:

(a) the seat has an outer edge co-planar with the outer edge of the web.

4. A beam connection assembly as claimed in claim 1, in which:

(a) the first and second members are intersecting beams having generally co-planar upper faces, and (b) the connector comprises a connecting flange being a co-planar and axially aligned extension of the upper flange, the connecting flange extending outwardly from adjacent the outer edge of the web and is aligned with the upper flange and adapted to receive the secondary fasteners to connect to the second member.

5. A beam connection assembly as claimed in claim 1, in which:

(a) the seat and the upper flange extend perpendicularly from the web.

6. A beam connection assembly as claimed in claim 1, in which:

(a) the web has a thickness as measured transversely to the vertical axial plane, and (b) the seat has a thickness as measured generally parallel to the vertical plane, the thicknesses of the web and seat being generally equal.

7. A beam connection assembly as claimed in claim 1, in which:

(a) the seat and the lower edge of the web intersect each other with a negligible radius therebetween so as to provide relatively sharp inwardly facing corners adjacent said lower edges of the web.

8. A beam connection assembly as claimed in claim 1, in which:

(a) the upper flange and the seat have respective widths defined by transverse spacing between respective side edges thereof, and said side edges of the seat are disposed inwardly of the side edges of the upper flange so that the width of the upper flange is greater than width of the seat.

* * * * *